April 21, 1931.  L. R. LOVELAND  1,801,356
AEROPLANE
Filed Sept. 25, 1929  6 Sheets-Sheet 5
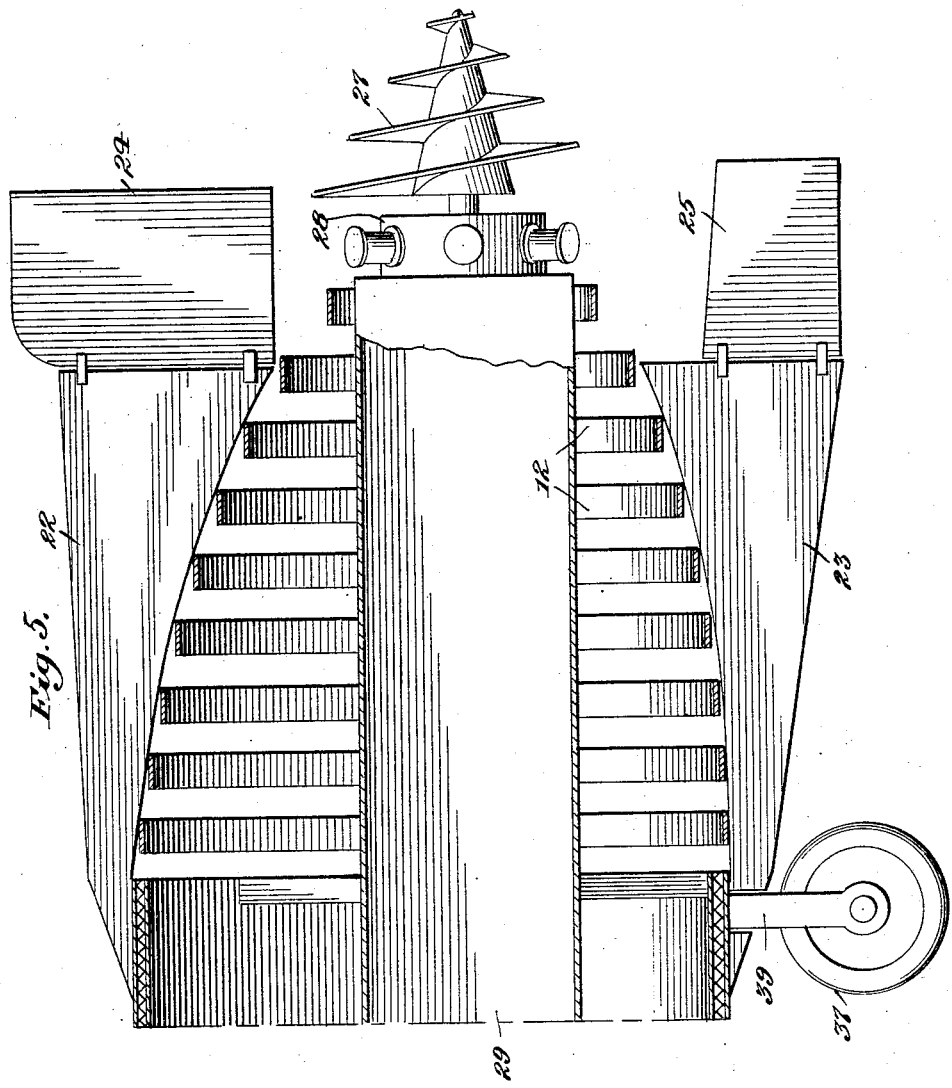
Inventor:
Lawrence R. Loveland,
Att'y.

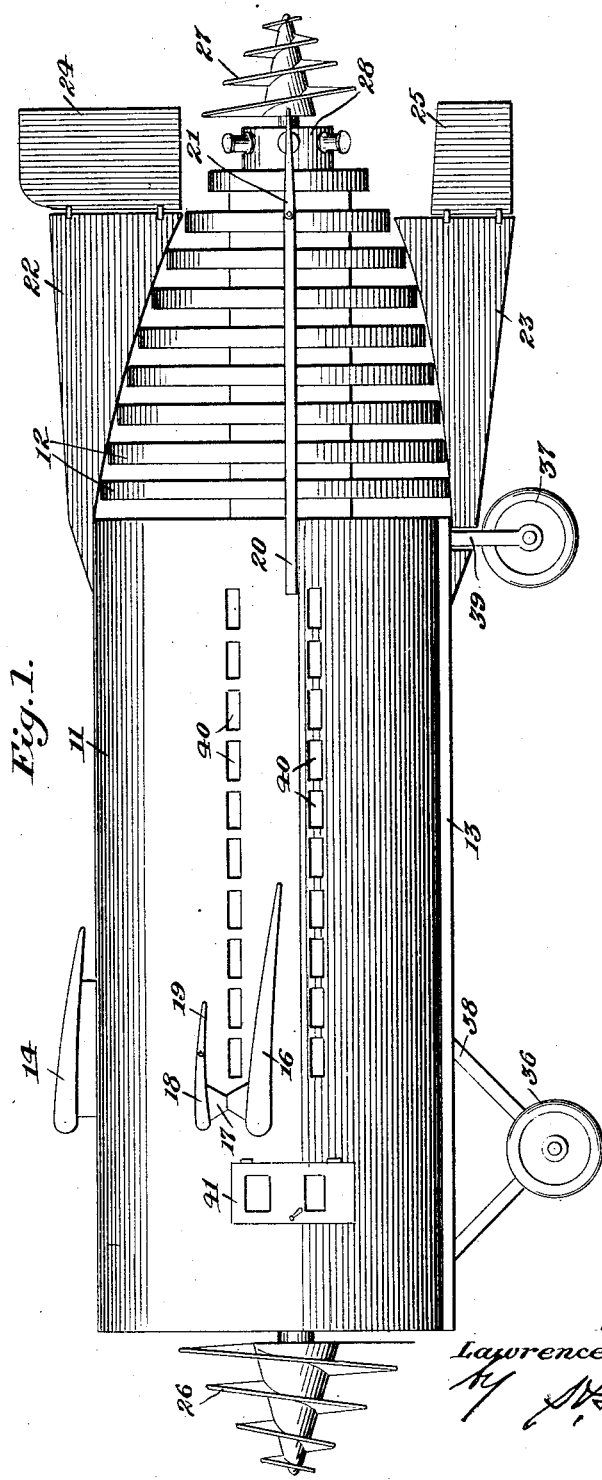

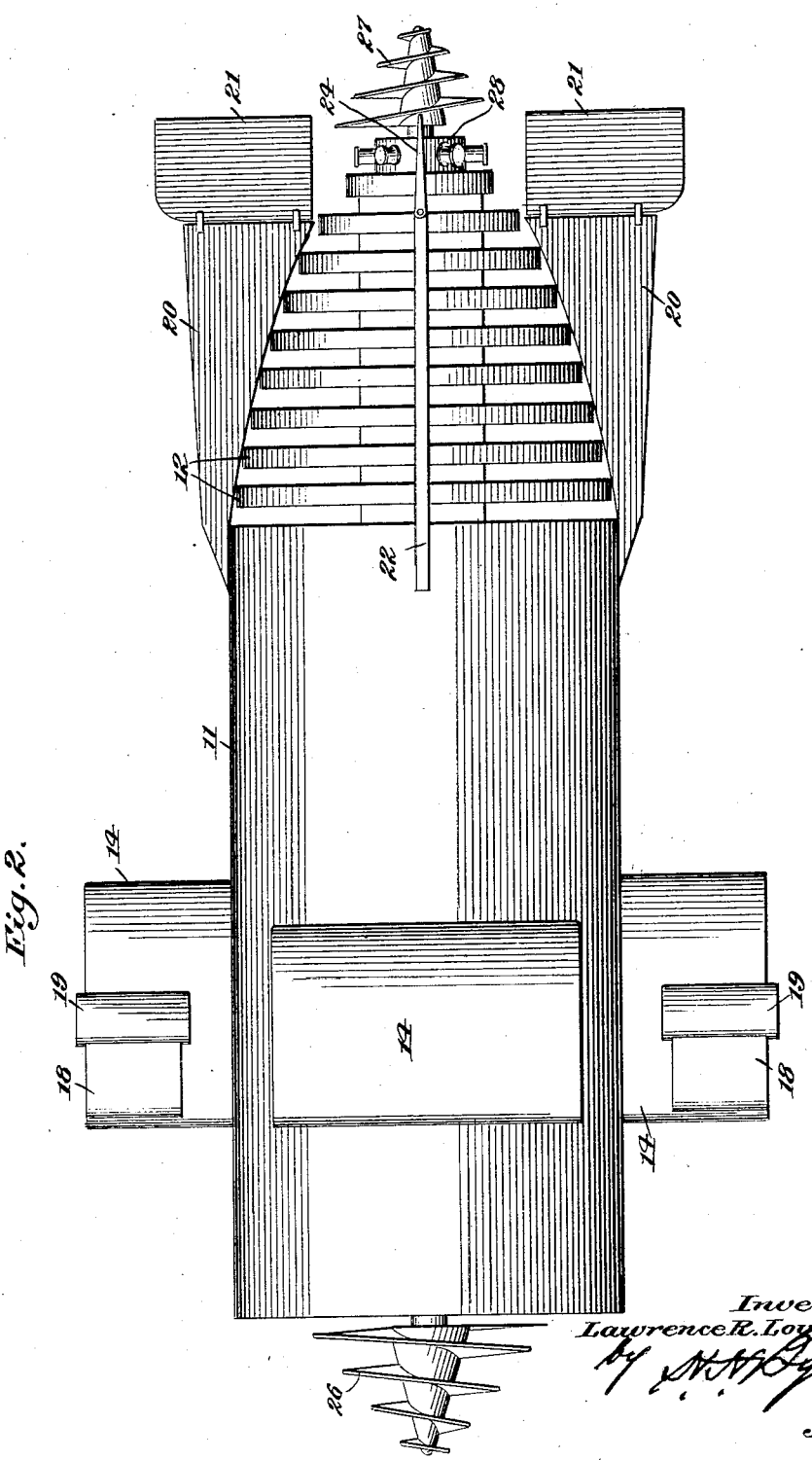

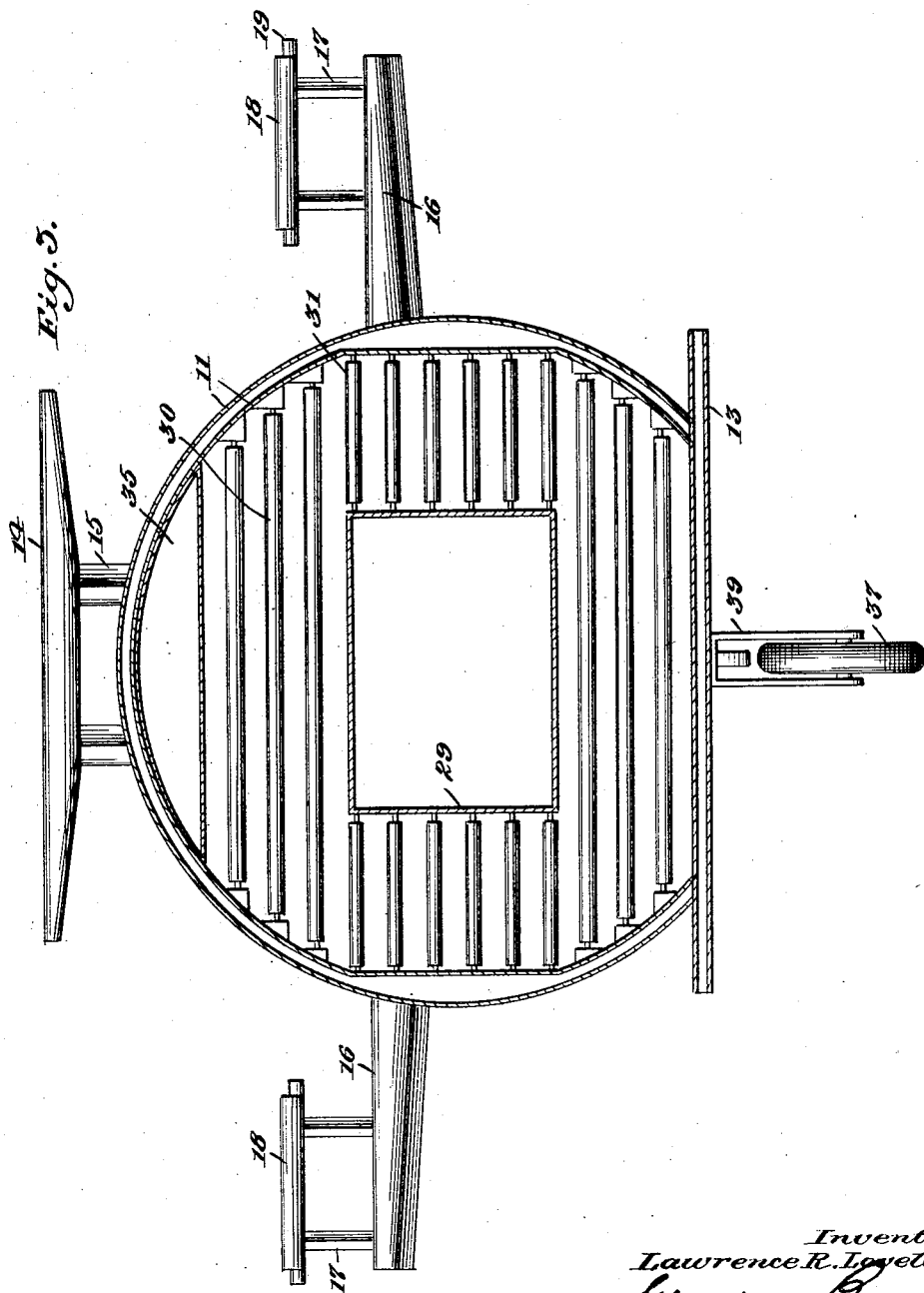

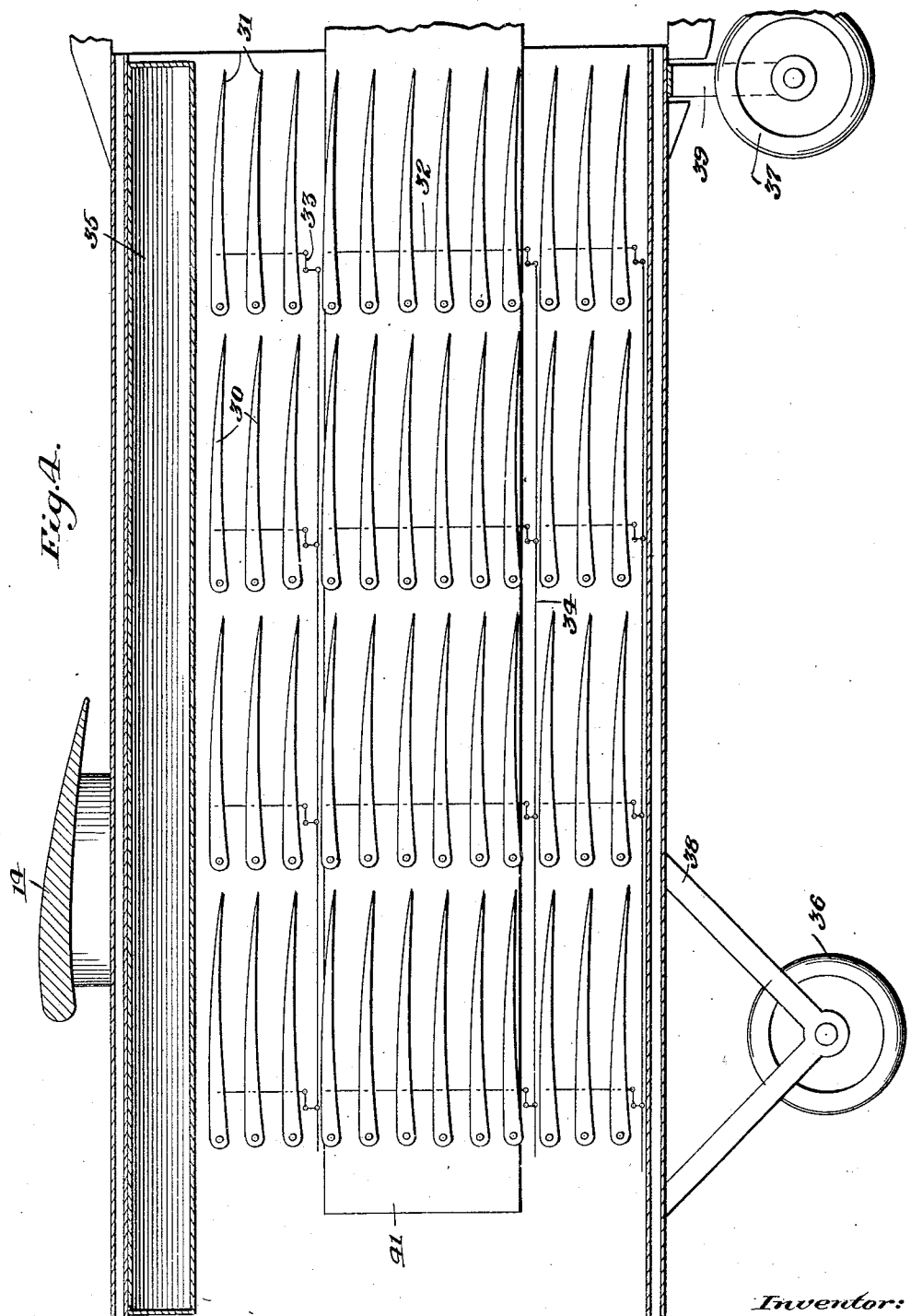

April 21, 1931.     L. R. LOVELAND     1,801,356
AEROPLANE
Filed Sept. 25, 1929     6 Sheets-Sheet 6
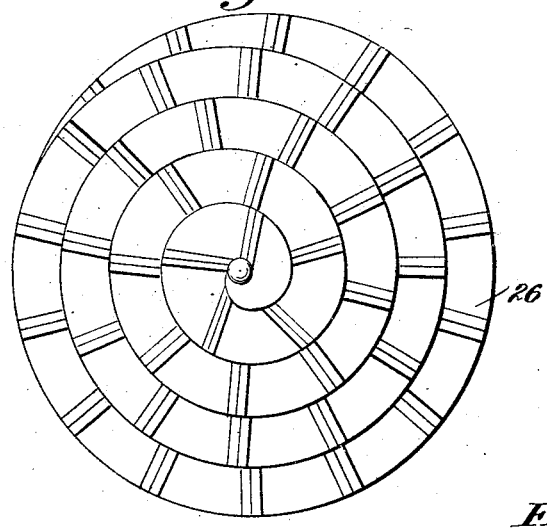
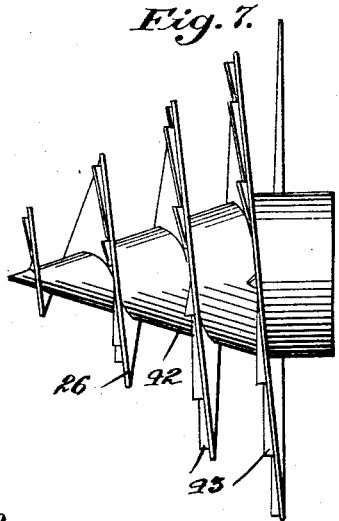
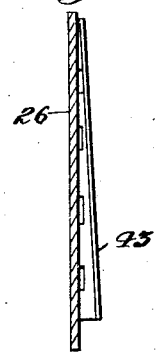
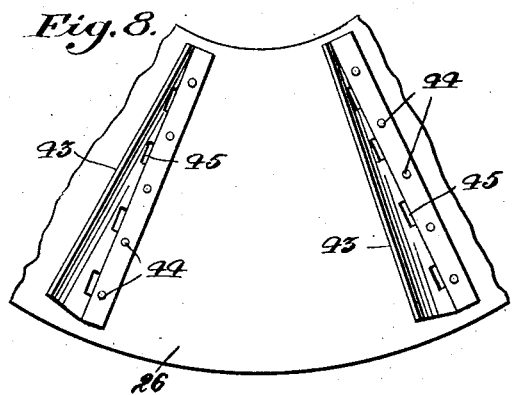
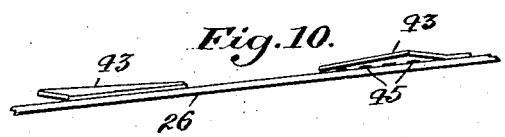
Inventor:
Lawrence R. Loveland,
Att'y.

Patented Apr. 21, 1931

1,801,356

UNITED STATES PATENT OFFICE

LAWRENCE R. LOVELAND, OF WASHINGTON, DISTRICT OF COLUMBIA

AEROPLANE

Application filed September 25, 1929. Serial No. 395,147.

The present invention relates to aircraft and consists in the combinations and arrangements of elements hereinafter described and particularly set forth in the accompanying claims.

The invention has for its purpose to construct an aeroplane wherein every structural part thereof provides lifting capacity and which is designed to carry fuel for giving maximum flying distance and at great speed, and with all controls thereof at the command of a single person.

Summarily stated the aircraft embodies an open-ended and appreciably long fuselage of cylindrical design, and a second or inner fuselage located centrally thereof and which is designed to carry the crew and passengers. The space between the inner and outer fuselage is provided with a plurality of supporting planes, and on the exterior of the outer fuselage are further supporting planes with the usual controls therefor. It is proposed to employ a tractor and pusher type of propeller of novel design and each of which is driven by an independent motor.

The aircraft embodies various other features of novelty that would be apparent from the following detailed description.

The invention is shown by way of illustration in the accompanying drawings wherein Figure 1 is a side elevational view of the aircraft complete.

Figure 2, a top plan view thereof.

Figure 3, a transverse sectional view taken between the wheels of the running gear.

Figure 4, a partial longitudinal sectional view showing the inner planes and the fuel tank.

Figure 5, an enlarged longitudinal sectional view of the rear portion of the aeroplane showing the inner and outer fuselage arrangement.

Figure 6 is a front elevational view of the type of screw propeller employed.

Figure 7, a side elevational view thereof.

Figure 8 shows a portion of the screw propeller.

Figure 9, a sectional view of Figure 8; and

Figure 10, an edgewise view thereof.

Referring to the construction in further detail and wherein like reference characters designate corresponding parts in the different views shown the aircraft consists of an outer or main fuselage 11 open-ended and of appreciable length and the interior space of which is utilized to carry a plurality of supporting planes. The main fuselage 11 is of substantially cylindrical design and at its rear portion is constructed grate-like to provide the series of ribs 12 of decreasing diameter and between the spaces of which escapes the air from the inner and secondary planes as shown.

The main or outer fuselage 11 is preferably of double walled type and of suitable aircraft material. Duralumin is believed the most appropriate substance. A base plane 13 underlies the outer fuselage 11 and a top plane 14 of appropriate camber is secured to the fuselage 11 by the struts 15. A pair of laterally projecting wings or planes 16 are suitably secured on either side of the main fuselage and mounted on each of said planes 16 by struts 17 there is a superposed and stabilizing plane 18. (See Figures 1 and 3). An aileron 19 is hingedly mounted at the rear of each stabilizing plane 18 to give the required lateral stability.

At the rear the main fuselage has fixedly mounted thereon and at either side a horizontal stabilizer 20 provided with a hinged elevator 21, and 22 and 23 designate the vertical and fixed vanes to which are hingedly mounted the rudders 24 and 25 to give lateralwise direction to the aircraft.

A tractor propeller 26 is located at the fore end of the fuselage 11 and a similar pusher propeller 27 is located at the rear thereof. Each of the propellers 26 and 27 is provided with its own motor 28 preferably of the radial type.

The inner fuselage 29 (see Figure 3) is of substantially rectangular cross-section located centrally of the main fuselage 11 and the space between the inner and outer fuselage is employed to contain a plurality of supporting planes 30 and 31. Said planes are arranged in superposed series after the manner shown in Figure 4 and are all connected by an appropriate link and lever mechanism 32 and 33 having connecting rods 34 leading to a common control and operative mechanism.

The upper inner portion of the main fuselage 11 houses a suitably designed fuel tank 35 that extends for substantially the full length of the fuselage to the end of providing for maximum flying radius.

The space within the inner fuselage 29 provides suitable room for the crew and passengers and otherwise gives ample accommodations for the usual equipment and controlling mechanism appertaining to airships designed for large carrying capacity.

The aircraft is equipped with the usual running gear comprising a pair of front wheels 36 and a rear wheel 37 suitably mounted on the fuselage by the struts 38 and 39 as shown (see Figures 1 and 4).

The fuselage 11 is further provided with a plurality of openings or windows 40 arranged in upper and lower groups and along the sides of the aircraft as indicated in Figure 1. A door 41 gives access to the interior of the aircraft.

The two propellers are similarly constructed though obviously pitched and each comprises a spiral and continuous blade portion mounted on a cone piece 42 and the several convolutions are of gradually increasing diameter to give the effect of a complete screw. To more effectively engage the air and produce the desired thrust the spiral blade is provided at suitable intervals with outstanding flanges or fin members 43 secured to said blade by rivets 44 or otherwise and along which secured edges said vanes are cut away to provide openings 45 to permit the escape of air as will be understood.

It is to be understood the invention is not limited to the details of construction here shown and disclosed, but that these may be varied widely without departing from the spirit of the invention as defined by the claims.

What is claimed as new is:—

1. In an aeroplane the combination of an appreciably long fuselage open at its fore end and having a grate-like construction at its rear end, a fuselage contained within and coextensive in length with the outer fuselage, a plurality of supporting planes located between said fuselages, supporting planes exterior of the outer fuselage, and propelling means therefor, substantially as set forth.

2. In an aeroplane the combination of an open-ended fuselage of circular cross-section and having a grate-like construction at its rear end, an inner fuselage of rectangular cross-section, a plurality of supporting planes located between said fuselages, supporting planes located exterior of the outer fuselage, and propelling means therefor, substantially as set forth.

3. In an aeroplane the combination of an outer and open-ended fuselage, a rectangular and open-ended fuselage contained therein, supporting planes, horizontal and vertical vanes fixedly mounted on said supporting planes, horizontal elevators and vertical rudders movably mounted on said vanes respectively, tractor and pusher propelling means, and independent motors for said propellers respectively, for the purposes set forth.

4. In an aeroplane the combination of an open-ended fuselage of cylindrical design, and having its rear end constructed grate-like; an inner fuselage located centrally thereof, a plurality of closely assembled planes located between the inner and outer fuselage, supporting planes located exterior of the outer fuselage, ailerons on said exterior supporting planes, horizontal and vertically disposed vanes fixed on fuselage at the grate-like portion thereof, elevators and rudders hingedly mounted on said horizontal and vertical vanes, tractor and pusher propellers mounted on the fuselage, and independent motors for said propellers, respectively, substantially as set forth.

5. In an aeroplane the combination of an open-ended fuselage of cylindrical design, a plurality of planes located within the fuselage, a base plane and a top plane for the fuselage, planes projecting laterally from the fuselage, ailerons on said lateral planes, and propelling means, substantially as set forth.

In witness whereof, I have hereunto set my hand at Washington, District of Columbia, this twenty-fourth day of September, A. D. nineteen hundred and twenty-nine.

LAWRENCE R. LOVELAND.